United States Patent [19]
Kim

[11] Patent Number: 5,920,428
[45] Date of Patent: Jul. 6, 1999

[54] REAL IMAGE FINDER

[75] Inventor: Moon-Hyun Kim, Changwon-si, Rep. of Korea

[73] Assignee: Samsung Aerospace Industries, Ltd., Changwon-si, Rep. of Korea

[21] Appl. No.: 08/974,980

[22] Filed: Nov. 20, 1997

[30] Foreign Application Priority Data

Nov. 26, 1996 [KR] Rep. of Korea ...................... 96-57303

[51] Int. Cl.$^6$ .................................................. G03B 13/06
[52] U.S. Cl. ........................... 359/432; 359/431; 359/689
[58] Field of Search ........................... 359/362, 421–423, 359/431–433, 676–678, 689, 831–837; 396/373–386

[56] References Cited

U.S. PATENT DOCUMENTS

| | | | |
|---|---|---|---|
| 5,144,349 | 9/1992 | Kato et al. | 396/379 |
| 5,231,534 | 7/1993 | Kato | 359/432 |
| 5,448,411 | 9/1995 | Morooka | 359/432 |
| 5,757,543 | 5/1998 | Ogata | 359/431 |

FOREIGN PATENT DOCUMENTS

| | | | |
|---|---|---|---|
| 5-297274 | 12/1993 | Japan . | |
| 6-160709 | 6/1994 | Japan | 359/432 |
| 6-95215 | 8/1994 | Japan . | |

*Primary Examiner*—Thong Nguyen
*Attorney, Agent, or Firm*—Howrey & Simon

[57] ABSTRACT

A real image finder includes an objective lens group, an inverting group and an eyepiece lens group. The objective lens group includes a first lens unit of a negative refractive power, a second lens unit of a positive refractive power, a third lens unit of a positive refractive power, and a first prism of a positive refractive power, where an exit surface of the first prism is convex toward an image. The objective lens group forms an inverted image. The inverting group forms an erect image by inverting the image formed through the objective lens group. The eyepiece lens group magnifies the erect image formed by the inverting group.

5 Claims, 4 Drawing Sheets

REAL IMAGE FINDER

BACKGROUND OF THE INVENTION (a) Field of the Invention

The present invention relates to a real image finder and, more particularly, to a real image finder which converts an inverted image formed through an objective lens group into an erect image by using two prisms and provides good image quality and a wide viewing angle.

(b) Description of the Related Art

In order to meet the current trend of being compact and light-weight, a camera must have a compact finder with a high zoom ratio as well as a small photographing system.

A finder used in a photographing system generally comprises an objective lens group and an eyepiece lens group. An image of an object is formed through the objective lens group and is magnified by the eyepiece lens group, so that a user can observe the image of the object through the eyepiece lens group. However, without an inverting eyepiece lens group, a user observes an inverted image because the objective lens group inverts the image upside down.

Consequently, a system for erecting the inverted image formed through an objective lens group is necessary either in an eyepiece lens group or an objective lens group.

In order to make a camera as compact as possible, methods for using a mirror or a prism to erect an inverted image have been proposed. Such methods have been disclosed in Japanese patent laid-open No. Hei 6-95215 and Japanese patent laid-open No. Hei 5-297274.

Japanese patent laid-open No. Hei 6-95215 proposes a finder which comprises an objective lens group, an eyepiece lens group, and two prisms. The prisms are located between the objective lens group and the eyepiece lens group, and serve to invert an image. Although the disclosure of the Japanese patent laid-open No. 6-95215 achieves a compact finder by reducing the total length of the system, the viewing angle at a wide-angle position is only 50° and the zoom ratio is a mere 1.75, both of which are inadequate.

Japanese patent laid-open No. Hei 5-297274 does not clearly describe how to erect an inverted image. Consequently, a longer focal length becomes necessary to achieve an erecting system. Thus, the resultant magnification ratio is low and a viewing angle becomes as small as 1.5 degrees, both of which are inadequate.

Furthermore, the disclosure in the Japanese patent laid-open No. Hei 5-297274 allows such a short eye relief distance as 15 mm that it is difficult to achieve a finder convenient for observation.

SUMMARY OF THE INVENTION

In view of the shortcomings of the prior art described above, it is an object of the present invention to provide a real image finder which provides an erect image by rotating an inverted image using a prism and has a short overall length as well as a viewing angle of approximately 62 degrees.

In order to achieve the above object, according to the present invention, a real image finder includes an objective lens group including a first lens of a negative refractive power, a second lens of a positive refractive power, a third lens of a positive refractive power, and a first prism of a positive refractive power, the objective lens group forming an inverted image, and an exit surface of the first prism being convex toward an image, an inverting group comprising a second prism that erects the inverted image formed through the objective lens group to be observed as normal, and an eyepiece lens group for magnifying the erect image formed through the inverting group.

It is to be understood that both the foregoing general description and the following detailed description are exemplary and are intended to provide further explanation of the claimed invention.

BRIEF DESCRIPTION OF THE DRAWINGS

The above objects and features of the present invention will be apparent from the following description of the preferred embodiment with reference to the accompanying drawings, wherein.

DETAILED DESCRIPTION OF THE PREFERRED EMBODIMENTS

The present invention will be described in detail with reference to the accompanying drawings.

Figure 1:
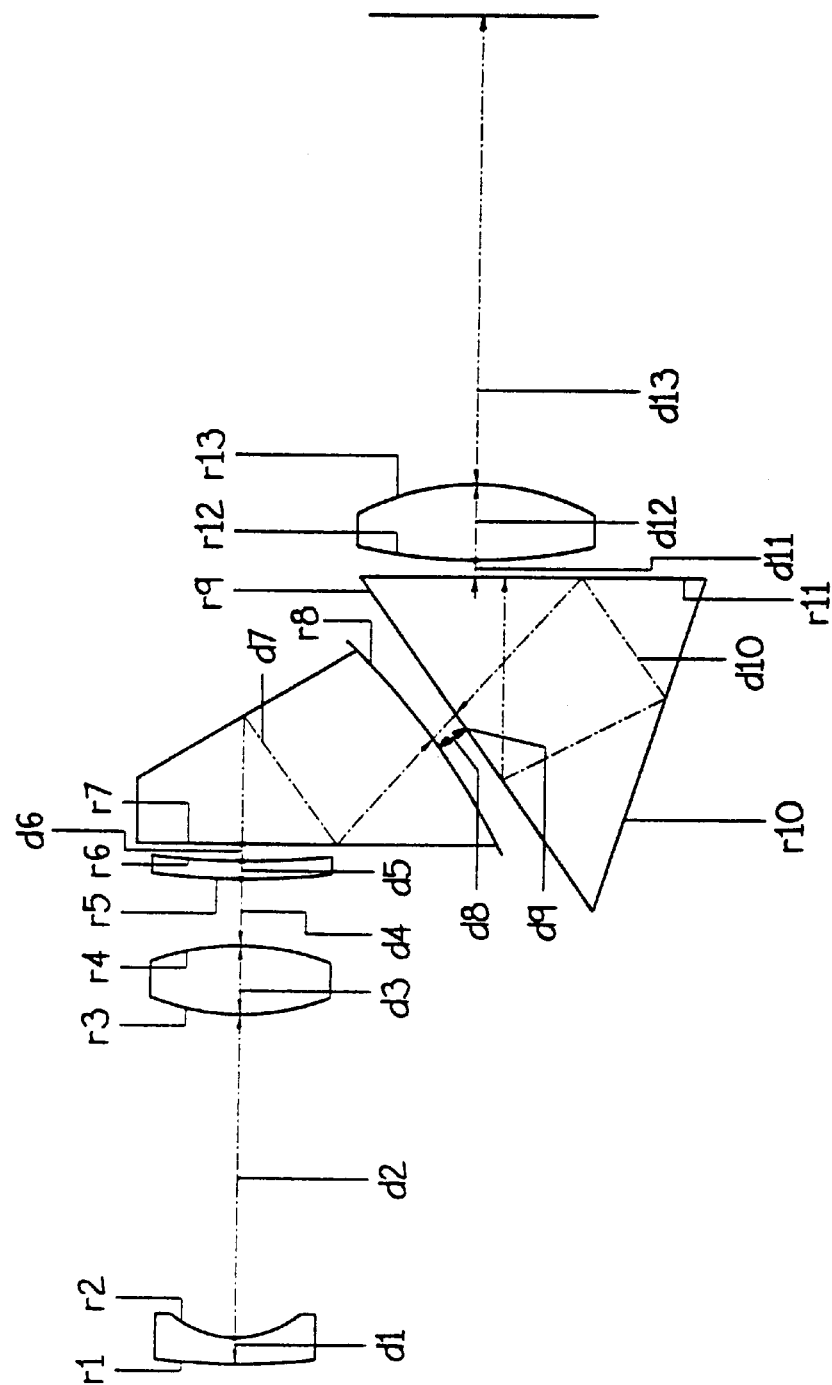
FIG. 1 is a sectional view of a real image finder according to the embodiment of the present invention at a wide-angle position.
Figure 2:
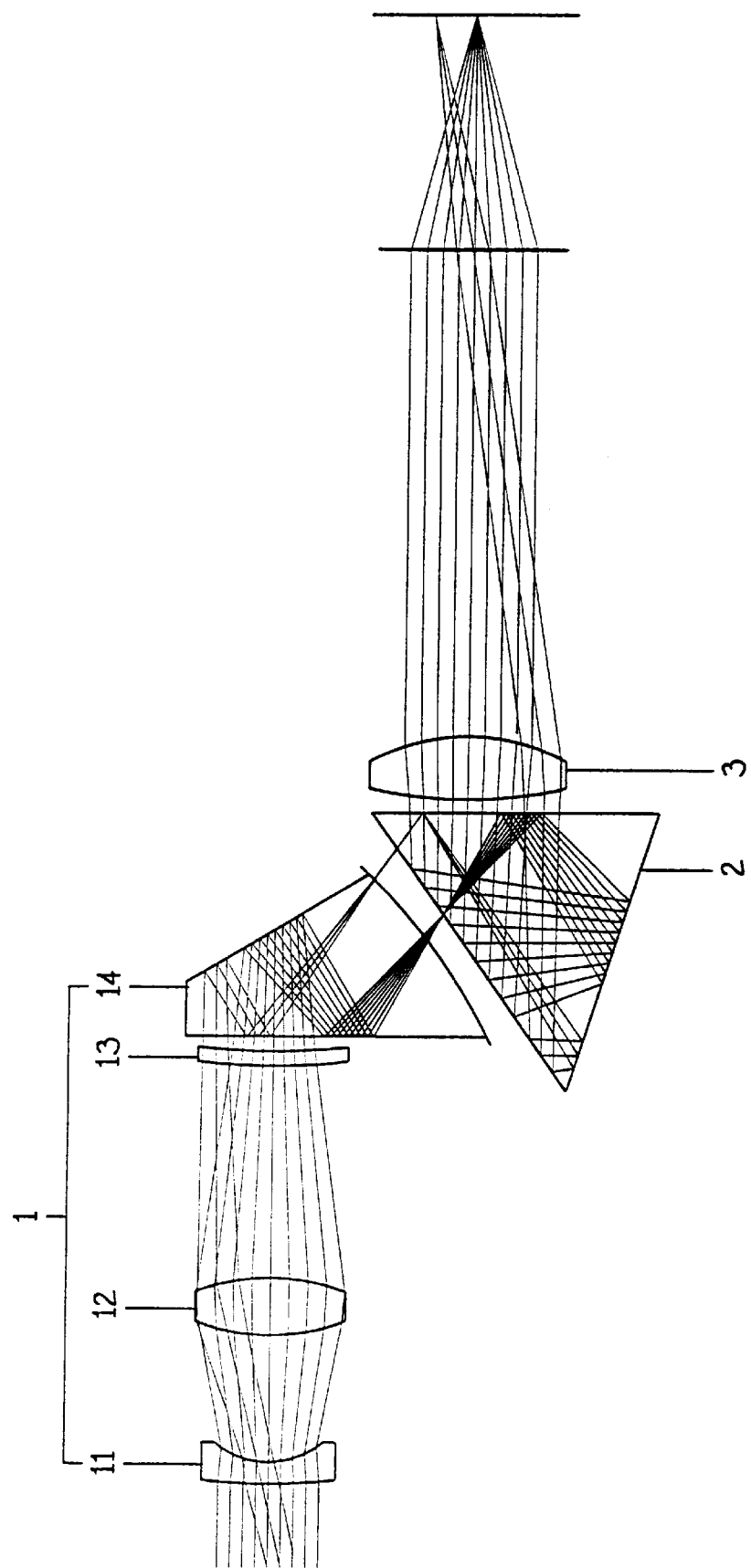
FIG. 2 is a sectional view of a real image finder according to the embodiment of the present invention at a telephoto position.

As shown in FIGS. 1 and 2, a real image finder according to the present invention includes an objective lens group 1 of a positive refractive power which forms an inverted image, an inverting group 2 for erecting the image formed through the objective lens group 1, and an eyepiece lens group 3 of a positive refractive power for magnifying the erect image formed through the inverting group.

The objective lens group 1 includes, when viewed from the object side, a first lens 11 having a negative refractive power, a second lens 12 having a positive refractive power, a third lens 13 having a positive refractive power, and a first prism 14 having a positive refractive power and an exit surface which is convex toward an image. The inverting group 2 comprises a second prism.

The magnification of the real image finder can be changed by varying a distance d2 of FIG. 1 between the first lens 11 and the second lens 12.

The operation of the real image finder is as follows. It is generally known that a real image finder requires a large eyepiece lens group 3 to catch the whole image when a main ray of marginal light through an objective lens group 1 diverges from the optical axis. On the other hand, when a main ray of marginal light through an objective lens group 1 converges onto the optical axis, an eye-relief distance becomes too short to observe an object without applying a user's eyes very close to an eyepiece lens group 3.

Accordingly, in the real image finder, it is very important to keep the main ray of marginal light parallel to the optical axis.

In the present invention, in order to maintain a main ray of marginal light parallel to the optical axis, the third lens 13 and the first prism 14 of objective lens group 1, both of which have a positive refractive power, function as a condenser lens that condenses a bundle of rays to the optical axis.

Without the condensing function of the third lens 13 and prism 14 in the objective lens group 1, parts of images that are supposed to be viewed through the finder are cut off unless the eyepiece lens group 3 is large enough. That is because a main ray of marginal light passed through the first lens 11 in the object lens group 1 occasionally diverges from the optical axis.

A convex and aspherical surface of the third lens unit 13 closest to the image side provides a proper back focal length for the objective lens group 1 that can compensate aberrations such as distortion and astigmatism.

The exit surface of the first prism 14 is convex toward an image such that the main ray of marginal light would not diverge from the optical axis, which might be caused by the convex surface of the third lens 13 closest to the image.

In the present invention, at least one of the two reflecting surfaces of the first prism 14 may be coated with a reflecting substance, and that reflecting substance may have impurities of coating materials. If a focal point is positioned on an exit surface of the first prism 14, those impurities may be observed clearly through the eyepiece. Accordingly, the first prism 14 should be located such that the focal plane of the objective lens group 1 is formed beyond the first prism 14.

In addition, the focal length of the objective lens group 1 should be short to realize a wide-angle finder. As the focal length of the object lens group 1 becomes short, the focal length of the eyepiece lens group 3 plays a relatively important role in determining the whole magnification ratio. Thus, by locating the focal plane of the object lens group 1 closer to the eyepiece lens group 3, the reduced focal length of the eyepiece lens group 3 could provide a higher magnification ratio.

A coefficient of an aspherical lens in the real image finder according to the embodiment is expressed by the following equation.

$$Z = cS^2/\{1+(1-(k+1)c^2S^2)^{1/2}\} + AS^4 + BS^6 + CS^8 + DS^{10}$$

where,

Z represents a distance from the lens vertex to an optical axis,

S represents a radial distance from the optical axis, c represents a reciprocal of the radius of curvature, k represents the conic constant, A, B, C, D represent aspherical coefficients.

Data for the examples of the present invention are shown in the Tables below. In each of these Tables, all units of length are denominated in millimeters and the following variables are used:

$r_i (i=1\sim13)$ represents a radius of curvature of a refractive surface;

$d_i (i=1\sim13)$ represents the thickness of a lens or the length between the lenses;

nd represents the d-line refractive power of a lens;

v represents the Abbe number of a lens;

ω represents the half viewing angle.

Data for the embodiment the present invention are shown in Table 1 in which the magnification ranges from −0.35 to 0.67, and the viewing angle 2ω ranges from 62.8° to 32.5°.

TABLE 1

| surface number | radius of curvature $r_i$ | distance $d_i$ | refractive power nd | Abbe number v |
|---|---|---|---|---|
| 1 | 35.600 | 0.80 | 1.49176 | 57.4 |
| *2 | 4.762 | d2 | | |
| *3 | 8.868 | 2.38 | 1.49176 | 57.4 |
| 4 | −9.195 | d4 | | |

TABLE 1-continued

| surface number | radius of curvature $r_i$ | distance $d_i$ | refractive power nd | Abbe number v |
|---|---|---|---|---|
| 5 | 36.929 | 0.80 | 1.49176 | 57.4 |
| *6 | −95.698 | 0.47 | | |
| 7 | ∞ | 13.20** | 1.49176 | 57.4 |
| 8 | −34.022 | 1.80 | | |
| 9 | ∞ | 0.00 | | |
| 10 | ∞ | 23.92** | 1.49176 | 57.4 |
| 11 | ∞ | 0.60 | | |
| *12 | 25.604 | 2.46 | 1.49176 | 57.4 |
| 13 | −12.845 | 18.22 | | | where * represents an aspherical surface and ** represents a converted optical path length considering the refractive power of the prism material.

The values of d2 and d4 represent the distances from these lenses that move while changing a magnification. These values are described in the following Table 2.

TABLE 2

| | wide-angle position | normal position | telephoto position |
|---|---|---|---|
| d2 | 10.954 | 9.419 | 4.606 |
| d4 | 0.805 | 2.31 | 7.039 |

The coefficients of the aspherical lens surface are expressed in the following Table 3.

TABLE 3

| | aspherical coefficients of the second surface | aspherical coefficients of the third surface |
|---|---|---|
| K  | −0.16032568E +2 | −0.98635005E +1 |
| A4 | 0.14945601E −1  | 0.17326006E −2  |
| A6 | −0.22981988E −2 | −0.14576432E −3 |
| A8 | 0.23670584E −3  | 0.10052031E −4  |
| A1 | −0.99099983E −5 | −0.28900460E −6 |

| | aspherical coefficients of the sixth surface | aspherical coefficients of the twelfth surface |
|---|---|---|
| K  | −0.59891489E +2 | −0.21000000E +2 |
| A4 | 0.90546458E −3  | 0 |
| A6 | 0.12579368E −4  | 0 |
| A8 | −0.39773056E −5 | 0 |
| A1 | 0.25057276E −6  | 0 |

Figure 3A:
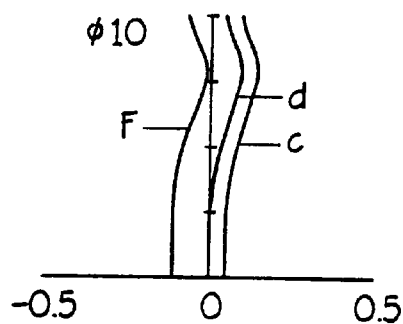
FIG. 3A illustrates aberration curves of the embodiment at a wide-angle position.
Figure 3A:
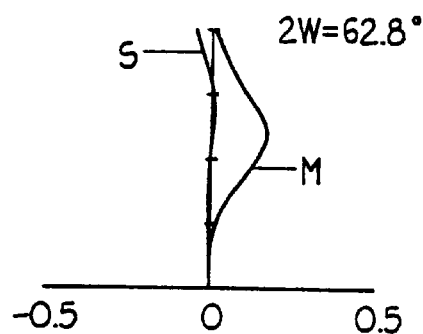
Figure 3A:
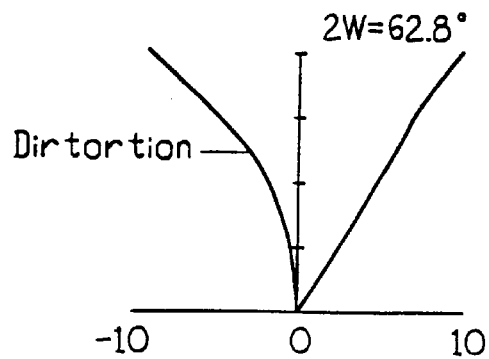
Figure 3B:
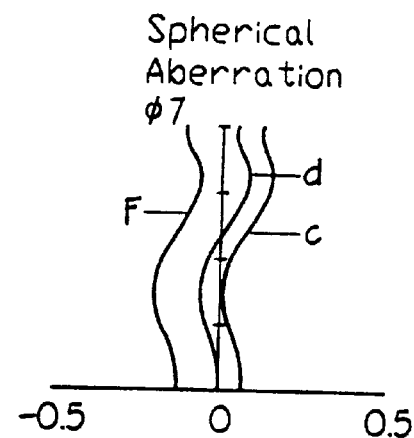
FIG. 3B illustrates aberration curves of the embodiment at a telephoto position.
Figure 3B:
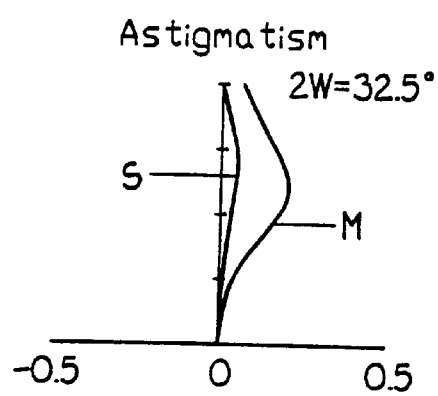
Figure 3B:
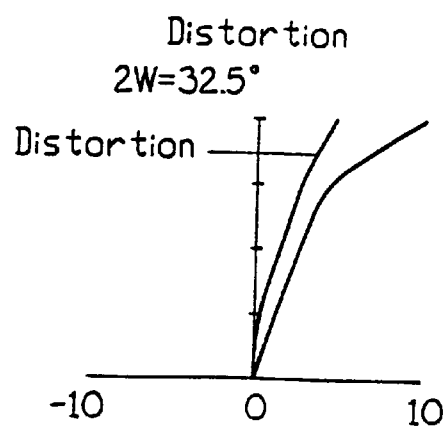

FIGS. 3*a* and 3*b* illustrate the superior aberration characteristics of the preferred embodiment, at a wide-angle and a telephoto position, respectively. In FIGS. 3*a* and 3*b*, the following variables are used: S which represents astigmatism in the sagittal direction; and M which represents astigmatism in the tangential direction.

As described above, the present invention constitutes a real image finder which has a high magnification, a compact construction, and superior performance due to the presence of the prism of the erecting system between the objective lens group and the eyepiece lens group.

While it has been shown and described one embodiment of the invention, it will be obvious to those skilled in the art that various changes and modifications can be readily made therein without departing from the scope and sprit of the invention as defined by the appended claims.

What is claimed is:

1. A real image finder comprising:

an objective lens group including a first lens unit having a negative power and a convex surface toward an object, a second lens unit having a positive power and which is biconvex, a third lens unit having a positive refractive power and a convex surface toward an image, the third lens unit being an aspherical lens, and a first prism which has a positive refractive power and a convex exit surface toward the image, the objective lens group forming an inverted image, wherein the first and second lens units move and the third lens unit is fixed when zooming;

an inverting lens group comprising a second prism which forms an erect image by erecting said inverted image formed through the objective lens group; and an eyepiece lens group for magnifying the erect image formed through the inverting lens group.

2. The real image finder of claim 1, wherein an entrance surface of the first lens unit is convex toward an object, and at least one of the first lens unit and the second lens unit have at least one aspherical surface.

3. The real image finder of claim 1, wherein a focal plane of the objective lens group is positioned on an entrance surface of the inverting lens group at a predetermined distance from an exit surface of the first prism.

4. The real image finder of claim 3, wherein the predetermined distance between the focal plane of the objective lens group and the exit surface of the first prism is greater than 1.5 mm.

5. The real image finder of claim 1, wherein the objective lens group, inverting lens group and the eyepiece lens group are made of the same material.

* * * * *